Nov. 8, 1927.
R. V. L. HARTLEY
1,648,121
APPARATUS AND SYSTEM FOR DETECTING VIBRATIONS
Filed July 16, 1919
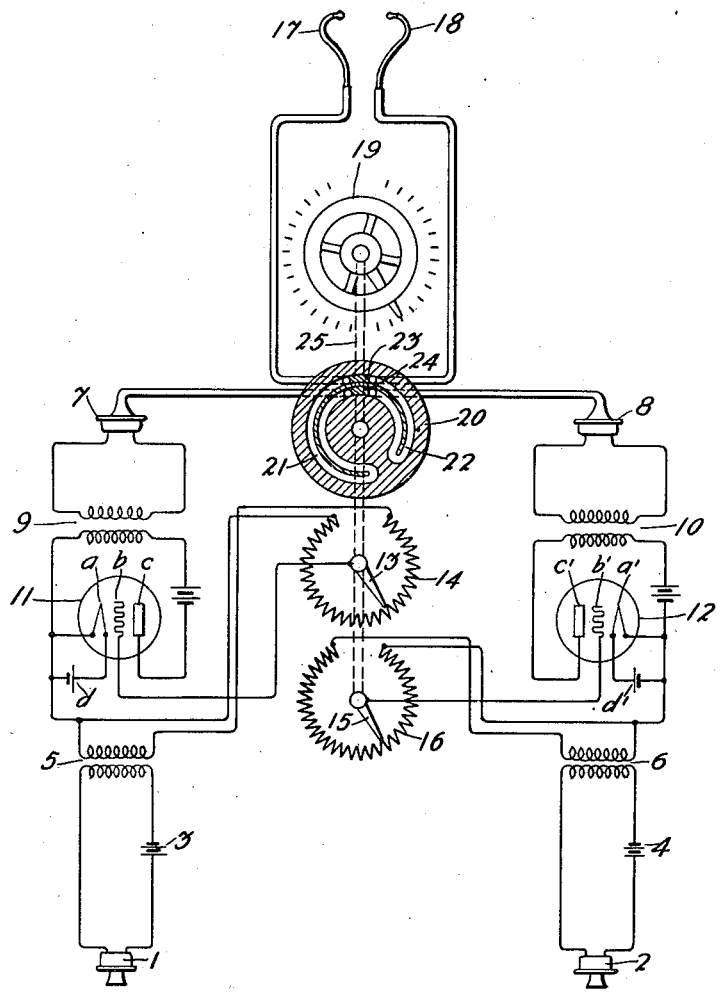
Inventor:
Ralph V. L. Hartley
by J. L. Roberts Att'y.

Patented Nov. 8, 1927.

1,648,121

UNITED STATES PATENT OFFICE.

RALPH V. L. HARTLEY, OF EAST ORANGE. NEW JERSEY, ASSIGNOR TO WESTERN ELECTRIC COMPANY, INCORPORATED, OF NEW YORK, N. Y., A CORPORATION OF NEW YORK.

APPARATUS AND SYSTEM FOR DETECTING VIBRATIONS.

Application filed July 16, 1919. Serial No. 311,191.

The invention relates to an apparatus and system for detecting and locating the direction, from a given point, of a source of vibration. It is designed particularly for use in connection with the so-called binaural method of locating the direction of a source of sound.

It has heretofore been proposed to locate the direction of a source of sound from an observing point by utilizing the difference in time of arrival of an effect produced by such source of sound at two separated points. The comparing of time of arrival is usually accomplished by means of a so-called binaural balance. In other words, the effect of the sound on the two separated points is reproduced either acoustically or electrically at the ears of an observer who is enabled by means of a compensator to measure in effect the difference in time of arrival of the sound effect at the two separated points. One arrangement, which has been proposed for use, involves the employment of two microphones a predetermined distance apart, which microphones are each arranged in circuit with a separate translating device, such as a telephone receiver. The telephone receivers are each connected by an acoustic path with the ear of the observer and a compensating device is provided to vary the relative lengths of these acoustic paths whereby, at any given instant, the compensator may be adjusted so that the effect in the ears of the observer is the same as though the observer was facing in the direction of the source of sound. By suitable calibration the amount of the compensation necessary to bring about this balance serves to indicate the direction of the source of sound.

Also it has been proposed to use instead of a compensator which varies the length of air path as above outlined, a compensator which will vary the electrical length of the paths between the detectors and the receiver. However, if either of these methods of compensation is used, while they are effective to compensate for difference in time of arrival of the impulse of the transmitter, the impulse which has to travel the longer path introduced by the compensator path is necessarily decreased in amplitude relative to the impulse which traverses the shorter path. This arbitrary difference in amplitude, which is introduced by the compensator, may introduce difficulty in obtaining the binaural balance or even cause a false balance unless the observer is particularly experienced in the use of the compensator.

It is an object of the present invention to eliminate the disturbing factor which results from the difference in amplitude inherent to compensation. In accordance with a feature of the invention, this object is attained by amplifying the impulse to compensate for the loss of amplitude introduced by the compensation for difference in time interval.

Inasmuch as the difference in time interval is represented in the electrical circuits from the detectors to the receivers by a difference in electrical phase, amplification without special precaution will have an effect upon this phase difference. Therefore, in accordance with another feature of the present invention, amplifying means is provided which is arranged to amplify the impulse without affecting the phase difference. In accordance with this feature of the invention, an amplifier of the vacuum tube type is employed which is associated with the electrical circuits through a pure resistance, which resistance may be varied for the purpose of varying the degree of amplification without affecting the phase of the electrical impulse which it is arranged to amplify. Also, in accordance with a feature of the invention, means is provided controlled from the compensator for varying the amplification in the two electrical circuits, which variation is determined by the degree of compensation. In accordance with this feature of the invention, there is provided a mechanical connection between the adjusting portion of the compensator and a switch or switches which vary the degree of amplification of the amplifier. These and other features of the invention, not specifically mentioned above, will more clearly appear from the following specification and the annexed drawing in which the figure shows diagrammatically the invention as applied to an arrangement utilizing microphone detectors in connection with an air path or acoustic compensators.

While the present invention will be described in connection with electrical detectors and an acoustic compensator, it is obvious that other forms of detectors and other forms of compensators could be used, for example, such as disclosed in copending applications, Serial Nos. 321,512 and 321,590, filed September 4, 1919.

Referring to the drawing, there are shown two detectors 1 and 2 which may be ordinary microphone detectors which are maintained a fixed distance apart, which distance is determined by the wave length of the sound which it is desired to detect. Each of these detectors is included in circuit with a source of potential 3—4 and one winding of a repeating coil 5—6. The detectors 1 and 2 have the same physical characteristics and are carefully matched, batteries 3 and 4 the same potential, and the repeating coils 5 and 6 the same electrical characteristics. Co-operating with the detector 1 is a receiver 7 and with the detector 2 a receiver 8, which may be of any well known type of telephone receiver. Each of these receivers is connected to a winding of the respective repeating coils 9 and 10. Intermediate detector 1 and the receiver 7, there is connected through the windings of the repeating coils 5 and 9, an amplifier 11. A similar amplifier 12 is connected intermediate the detector 2 and the receiver 8. These amplifiers are of the well known vacuum tube type and include the usual heated electrode, modifying electrode and other electrodes indicated by the letters $a$, $b$, $c$ and $a'$, $b'$ and $c'$. There is also provided a source of heating battery for the heated electrode indicated at $d$ and $d'$. A winding of the repeating coil 5 is included in the input circuit of the amplifier 11, which input circuit may be traced from one side of the winding of the repeating coil through the heated electrode $a$, the modifying electrode $b$, the switch arm 13, and through a resistance 14, the amount of which is determined by the position of arm 13, to the other side of the repeating coil. The output circuit of the amplifier 11 includes a source of potential, a winding of the repeating coil 9, the heated electrode $a$ and the plate electrode $c$. The input and output circuits of the amplifier 12 are similar to those traced in connection with the amplifier 11, except that the input circuit includes a variable amount of the resistance 16 as determined by the position of the switch arm 15.

There is provided between the receivers 7 and 8 and the earpieces 17 and 18 two independent acoustic paths, the length of which may be varied by the rotation of the compensator wheel 19 and a consequent rotation of the adjustable disc 20. For example, an acoustic path may be traced from the receiver 7 through the left-hand path 21 in the disc 20 to the earpiece 17 and from the receiver 8 through the right-hand path 22 in the disc 20 to the earpiece 18. It is obvious that if the disc 20 is moved relative to the stops 23 and 24, one of the acoustic paths will be lengthened and the other shortened. This adjustment is accomplished through the shaft 25 upon which the member 20 may be mounted. Also mounted upon the shaft 25 are the arms 13 and 15, so that any adjustment of the member 20 necessary to obtain the binaural balance will cause a corresponding adjustment of the arms 13 and 15. For example, assume that in order to obtain a binaural balance the hand wheel 19 is rotated in a clockwise direction to increase the length of the acoustic path between receiver 8 and the earpiece 18. This will cause an increased amount of the resistance 16 to be included in the input circuit of the amplifier 12 and will decrease the amount of resistance included in the input circuit of the amplifier 11, so that in increasing the total length of the path between the detector and the ear of the observer for compensating purposes, there is an adjustment of the amplification in such path to prevent a corresponding loss of amplitude. Similarly, if the compensator wheel is rotated in a counterclockwise direction, the length of path between the detector 1 and the earpiece 17 will be increased and at the same time the amplification will be increased, since under those circumstances more resistance will be included in the input circuit of the amplifier 11 and less in the input circuit of the amplifier 12.

As is well known, if more resistance is included in the input circuit of an amplifier of the type described, the amplifying ratio of the amplifier is correspondingly increased.

While the invention has been described in connection with a binaural method of sound detection where it will probably find its widest application, it is obvious that the invention may also be used in connection with various methods of comparing the phase relation in electrical circuits or for measuring small time intervals.

What is claimed is:

1. In combination, a plurality of impulse transmitting paths, means to relatively adjust the lengths of said paths to synchronize the impulses transmitted thereover, and means operated in the adjustment of said path-adjusting means to relatively counteract loss in transmission due to such adjustment.

2. A plurality of impulse transmitting paths, means for adjusting the relative lengths of said paths, impulse amplifying means included in said paths, means for adjusting said amplifying means, and means interconnecting said length adjusting means and said amplifying means to adjust said amplifying means to correspondingly amplify said impulses, said last mentioned means being operated by the adjustment of said length adjusting means.

3. The combination of a pair of transmitting paths, means for generating and transmitting impulses over said paths, means for retarding the impulses in one path relative to impulses in the other, and for correspondingly amplifying said retarded impulses.

4. In combination, a plurality of impulse transmitting paths, means to relatively adjust the lengths of said paths to synchronize the impulses transmitted thereover, and means operated by said length adjusting means to relatively counteract loss in transmission due to such adjustment.

5. A plurality of impulse transmitting paths, an amplifier individual to each path, a detector individual to each path, means for varying the amplifying ratio of one of said amplifiers, means for varying the amplifying ratio of the other of said amplifiers, means for changing the phase relations of the impulses in said paths so connecting said varying means that operation of either of said varying means causes the amplification ratio of each of said amplifiers to vary and in such manner relative to the variation of the amplification ratio of the other amplifier as to produce a resultant relative change in the amplification ratios, and means whereby effects of the impulses emerging from one of said paths and effects of impulses emerging from the other of said paths may be correlated.

6. In a system for determining the direction of a source of sound, a pair of detectors, a pair of transmitting paths including said detectors, means for transmitting impulses generated by said detectors to an observing point, means for relatively shifting the phase of the impulses generated in the two paths to bring such impulses into synchronism, and means controlled by said phase shifting means for relatively amplifying said impulses to compensate for the loss in amplitude due to shifting the phase thereof.

7. In apparatus for detecting the direction of a source of sound, in combination, a pair of detectors, a pair of transmitting paths extending from such detectors to an observing point, means for adjusting the length of said transmitting paths to bring said impulses into coincidence and means controlled by said adjusting means for amplifying said impulses in accordance with the changes of length of said paths.

8. Apparatus for detecting the direction of a source of sound, comprising a pair of separated detectors, a pair of transmitting paths extending from said detectors to a common observing point, means for relatively varying the length of said paths between said detectors and said observing point to obtain a binaural balance, and variable means included in said paths for amplifying said impulses in accordance with the variations in length of said paths.

9. Apparatus for detecting the direction of a source of sound, comprising a pair of separated detectors, a pair of transmitting paths extending from said detectors to a common observing point, means for relatively varying the length of said paths between said detectors and said observing point to obtain a binaural balance, amplifying means included in each path, and common means for adjusting the amplifying ratio of said amplifiers in accordance with the change of length of said paths.

10. The method which comprises generating impulses, transmitting them over a pair of paths, retarding the impulses in one of said paths relative to impulses in the other, and correspondingly amplifying said impulses.

11. The method which comprises transmitting impulses over a pair of transmitting paths, varying the propagation time and consequently the attenuation of one path relatively to the other, and counteracting the relative change in attenuation.

In witness whereof, I hereunto subscribe my name this 14th day of July A. D., 1919.

RALPH V. L. HARTLEY.